United States Patent
Choi et al.

(10) Patent No.: US 11,336,845 B2
(45) Date of Patent: May 17, 2022

(54) IMAGE SENSOR AND DRIVING METHOD THEREOF

(71) Applicant: SAMSUNG ELECTRONICS CO., LTD., Suwon-si (KR)

(72) Inventors: Wontak Choi, Seoul (KR); Kwi Sung Yoo, Yongin-si (KR); Jaejin Jung, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 196 days.

(21) Appl. No.: 16/745,508

(22) Filed: Jan. 17, 2020

(65) Prior Publication Data

US 2021/0006761 A1 Jan. 7, 2021

(30) Foreign Application Priority Data

Jul. 1, 2019 (KR) ........................ 10-2019-0078901

(51) Int. Cl.
| | |
|---|---|
| *H04N 5/353* | (2011.01) |
| *H04N 9/77* | (2006.01) |
| *H04N 9/04* | (2006.01) |
| *H04N 9/797* | (2006.01) |
| *H04N 9/83* | (2006.01) |
| *H04N 5/355* | (2011.01) |

(52) U.S. Cl.
CPC .......... *H04N 5/3537* (2013.01); *H04N 5/355* (2013.01); *H04N 5/3535* (2013.01); *H04N 5/35554* (2013.01); *H04N 5/35563* (2013.01); *H04N 5/35581* (2013.01); *H04N 9/0451* (2018.08); *H04N 9/77* (2013.01); *H04N 9/7973* (2013.01); *H04N 9/7976* (2013.01); *H04N 9/832* (2013.01); *H04N 9/0455* (2018.08)

(58) Field of Classification Search
CPC .... H04N 5/353; H04N 5/3535; H04N 5/3537; H04N 5/35563
See application file for complete search history.

(56) References Cited

U.S. PATENT DOCUMENTS

| | | |
|---|---|---|
| 8,742,310 B2 | 6/2014 | Guezzi et al. |
| 9,237,281 B2 | 1/2016 | Fukuda |
| 9,774,801 B2 | 9/2017 | Hseih et al. |

(Continued)

FOREIGN PATENT DOCUMENTS

KR   10-2017-0066217 A   6/2017

*Primary Examiner* — David N Werner
(74) *Attorney, Agent, or Firm* — Lee IP Law, P.C.

(57) ABSTRACT

An image sensor includes a first unit pixel including a first sub-pixel and a second sub-pixel, a second unit pixel including a third sub-pixel and a fourth sub-pixel, a timing controller configured to apply a first effective integration time to the first sub-pixel and the fourth sub-pixel, such that a first sensing signal and a fourth sensing signal are generated from the first sub-pixel and the fourth sub-pixel, respectively, and to apply a second effective integration time shorter than the first effective integration time to the second sub-pixel and the third sub-pixel, such that a second sensing signal and a third sensing signal are generated from the second sub-pixel and the third sub-pixel, respectively, and an analog-to-digital converter configured to perform an averaging operation on the first sensing signal and the fourth sensing signal or on the second sensing signal and the third sensing signal.

19 Claims, 16 Drawing Sheets

(56) References Cited

U.S. PATENT DOCUMENTS

| | | |
|---|---|---|
| 9,819,889 B2 | 11/2017 | Solhusvik |
| 10,447,951 B1* | 10/2019 | Lee .................. H04N 5/243 |
| 2005/0099504 A1* | 5/2005 | Nayar ................ H04N 5/235<br>348/222.1 |
| 2008/0128598 A1* | 6/2008 | Kanai ............ H01L 27/14605<br>250/226 |
| 2008/0211945 A1* | 9/2008 | Hong ............... H04N 5/35563<br>348/294 |
| 2009/0021612 A1* | 1/2009 | Hamilton, Jr. ..... H04N 9/04559<br>348/249 |
| 2013/0027591 A1* | 1/2013 | Lukac ............ H01L 27/14627<br>348/242 |
| 2013/0083230 A1* | 4/2013 | Fukuda ........... H01L 27/14627<br>348/340 |
| 2013/0088594 A1* | 4/2013 | Wyles ................. H04N 5/347<br>348/144 |
| 2014/0176724 A1* | 6/2014 | Zhang .................. B60R 1/00<br>348/164 |
| 2015/0208005 A1* | 7/2015 | Moesle .............. H04N 5/3537<br>348/148 |
| 2015/0363944 A1* | 12/2015 | Elliott ............... H04N 5/35563<br>345/589 |
| 2016/0044257 A1* | 2/2016 | Venkataraman ....... H04N 5/369<br>348/239 |
| 2016/0119559 A1* | 4/2016 | Hsu .................... H04N 9/04557<br>348/280 |
| 2016/0255289 A1* | 9/2016 | Johnson ............. H04N 9/04557<br>348/273 |
| 2017/0142446 A1 | 5/2017 | Leleannec et al. |
| 2017/0163917 A1* | 6/2017 | Yamada ................. H04N 5/232 |
| 2017/0366769 A1* | 12/2017 | Mlinar ............. H01L 27/14627 |
| 2018/0146148 A1 | 5/2018 | Kaneko et al. |
| 2018/0152677 A1* | 5/2018 | Komori ............ H01L 27/14645 |
| 2018/0191974 A1* | 7/2018 | Shim ...................... H04N 5/345 |
| 2018/0191979 A1* | 7/2018 | Mu ....................... H04N 5/3741 |
| 2018/0242827 A1 | 8/2018 | Michihata |
| 2018/0269245 A1 | 9/2018 | Mlinar et al. |
| 2019/0019835 A1 | 1/2019 | Tanaka et al. |
| 2019/0067346 A1* | 2/2019 | Borthakur .......... G02B 6/12019 |
| 2019/0222738 A1* | 7/2019 | Galor Gluskin ..... H04N 5/2355 |
| 2019/0364186 A1* | 11/2019 | Park ................... H04N 5/36961 |
| 2021/0044768 A1* | 2/2021 | Kuroda ............. H04N 5/35563 |

* cited by examiner

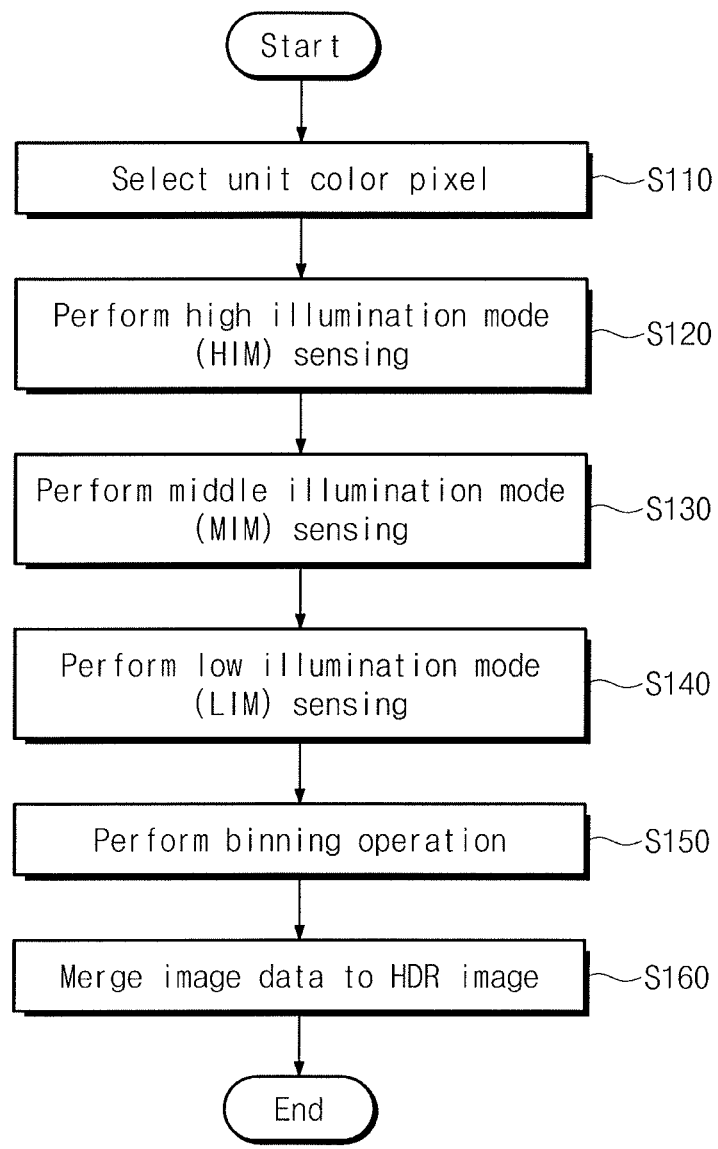

FIG. 14

| L1 | S2 | M3 | E4 | A5 |
|----|----|----|----|----|
| S1 | M2 | L3 | A4 | E5 |
| M1 | E2 | A3 | L4 | S4 |
| E1 | A2 | E3 | S4 | M4 |
| A1 | L2 | S3 | M4 | L5 |

UP1 (FD1)  UP2 (FD2)  UP3 (FD3)  UP4 (FD4)  UP5 (FD5)

IMAGE SENSOR AND DRIVING METHOD THEREOF

CROSS-REFERENCE TO RELATED APPLICATION

Korean Patent Application No. 10-2019-0078901, filed on Jul. 1, 2019, in the Korean Intellectual Property Office, and entitled: "Image Sensor and Driving Method Thereof," is incorporated by reference herein in its entirety.

BACKGROUND

1. Field

Embodiments relate to an image sensor, and more particularly, to an image sensor providing a high dynamic range mode and a driving method thereof.

2. Description of the Related Art

One of important criteria for determining the quality of an image sensor is a dynamic range. In general, the dynamic range indicates a maximum range capable of processing an input signal without distortion of the input signal. As the dynamic range becomes wider, an image obtained by the image sensor may become clearer within a wide illumination range.

SUMMARY

According to an exemplary embodiment, an image sensor for sensing an image signal of a plurality of illumination ranges includes a first unit pixel that includes a first sub-pixel and a second sub-pixel, a second unit pixel that includes a third sub-pixel and a fourth sub-pixel, a timing controller that applies a first effective integration time to the first sub-pixel and the fourth sub-pixel such that a first sensing signal and a fourth sensing signal are generated from the first sub-pixel and the fourth sub-pixel and applies a second effective integration time shorter than the first effective integration time to the second sub-pixel and the third sub-pixel such that a second sensing signal and a third sensing signal are generated from the second sub-pixel and the third sub-pixel, and an analog-to-digital converter that performs an averaging operation on the first sensing signal and the fourth sensing signal or on the second sensing signal and the third sensing signal.

According to an exemplary embodiment, a driving method of an image sensor including first to fourth sub-pixels constituting a unit color pixel includes sampling a first sensing signal and a second sensing signal from the first sub-pixel and the second sub-pixel respectively by applying a first effective integration time to the first sub-pixel and the second sub-pixel, sampling a third sensing signal and a fourth sensing signal from the third sub-pixel and the fourth sub-pixel respectively by applying a second effective integration time shorter than the first effective integration time to the third sub-pixel and the fourth sub-pixel, and performing an averaging operation on the first sensing signal and the second sensing signal and performing the averaging operation on the third sensing signal and the fourth sensing signal. The first sub-pixel and the fourth sub-pixel share a first charge detection node, and the second sub-pixel and the third sub-pixel share a second charge detection node.

According to an exemplary embodiment, an image sensor for sensing an image signal of a plurality of illumination ranges includes a first unit pixel that includes a first sub-pixel, a second sub-pixel, and a third sub-pixel sharing a first charge detection node, a second unit pixel that includes a fourth sub-pixel, a fifth sub-pixel, and a sixth sub-pixel sharing a second charge detection node, and a third unit pixel that includes a seventh sub-pixel, an eighth sub-pixel, and a ninth sub-pixel sharing a third charge detection node, and the first unit pixel, the second unit pixel, and the third unit pixel output sensing signals individually by using the first charge detection node, the second charge detection node, and the third charge detection node.

BRIEF DESCRIPTION OF THE FIGURES

Features will become apparent to those of skill in the art by describing in detail exemplary embodiments with reference to the attached drawings, in which:

FIG. 5 illustrates a flowchart of an HDR sensing method of an image sensor according to an embodiment.

FIG. 14 illustrates a diagram of a unit color pixel illustrated in FIG. 1 according to another embodiment.

DETAILED DESCRIPTION

Figure 1:
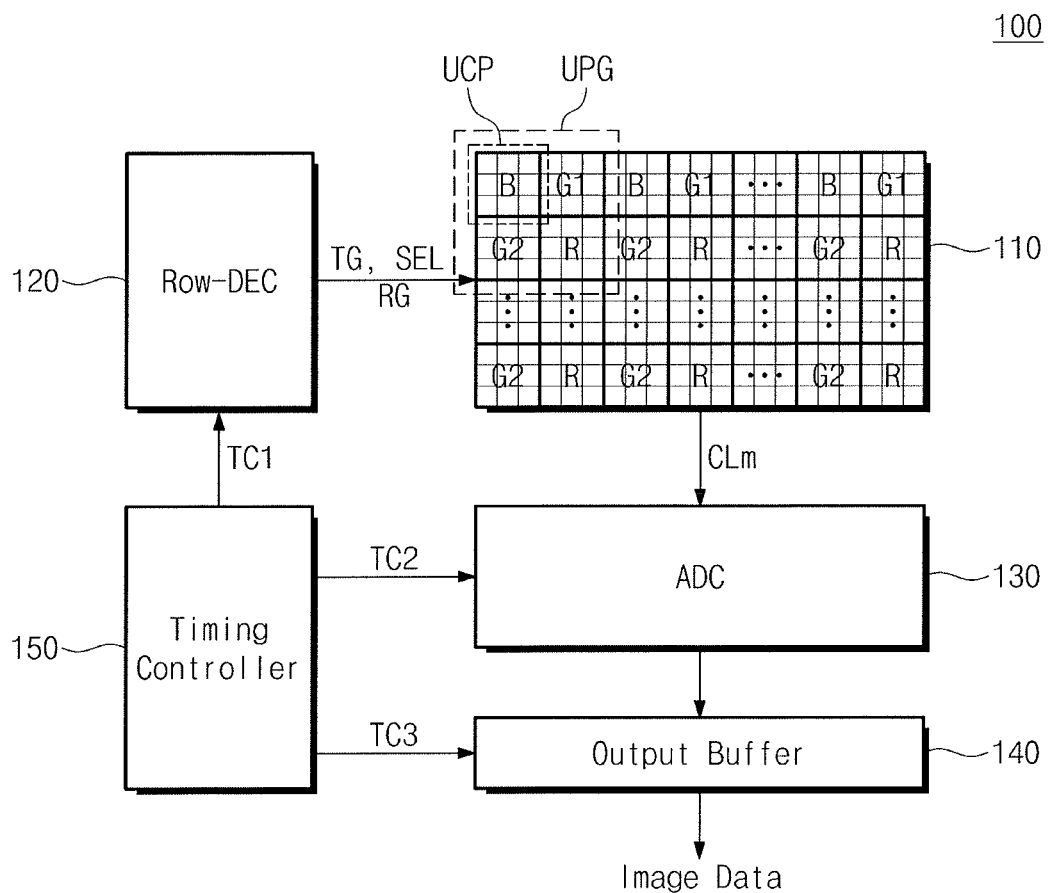
FIG. 1 illustrates an image sensor according to an embodiment.

FIG. 1 illustrates an image sensor according to an embodiment. Referring to FIG. 1, an image sensor 100 may include a pixel array 110, a row decoder 120, an analog-to-digital converter (ADC) 130, an output buffer 140, and a timing controller 150.

The pixel array 110 may include a plurality of pixel sensors arranged two-dimensionally. Each of the pixel sensors converts a light signal into an electrical signal. The pixel array 110 may be controlled by signals, which are provided from the row decoder 120 for the purpose of driving the pixel sensors, e.g., a selection signal SEL, a reset signal RG, and a transmission signal TG. Also, electrical signals that are sensed by the pixel sensors in response to the signals for driving pixel sensors are provided to the analog-to-digital converter 130 through a plurality of column lines CLm.

The plurality of pixel sensors included in the pixel array 110 are divided into unit pixel groups UPG each sensing a blue (B) color, a green (G1/G2) color, and a red (R) color. The unit pixel group UPG may include unit color pixels UCP for sensing the colors, respectively. Each of the unit color pixels UCP may include a color filter capable of selectively transmitting a corresponding color. For example, as illustrated in FIG. 1, the color filter includes filters to sense the red, green, and blue colors. In another example, the color filter may include filters for sensing yellow, cyan, magenta, and green colors. In yet another example, the color filter may include filters for sensing red, green, blue, and white colors.

Each of the unit color pixels UCP includes a plurality of unit pixels UP. One unit pixel UP includes a plurality of sub-pixels SP. One unit pixel UP includes a plurality of photoelectric conversion elements sharing one charge detection node (e.g., a floating diffusion region). One photoelectric conversion element may correspond to one sub-pixel SP. According to a unit color pixel (UCP) structure, in a high dynamic range mode (below, it is interchangeable with an HDR mode), a plurality of sensing signals corresponding to the same effective integration time EIT may be obtained from one unit color pixel UCP. That is, to implement the HDR mode, the unit pixels UP constituting the unit color pixel UCP may output sensing signals at the same time. In this case, a speed at which sensing data are output may be improved in the HDR mode of the unit color pixel UCP, thus increasing a frame rate. A configuration and an operation of the unit color pixel UCP will be more fully described with reference to drawings below.

The row decoder 120 may select one of rows of the pixel array 110 under control of the timing controller 150. The row decoder 120 generates the selection signal SEL in response to a control signal TC1 from the timing controller 150 for the purpose of selecting one or more of a plurality of rows. The row decoder 120 may sequentially activate (or enable) the reset signal RG and the transmission signal TG with regard to pixels corresponding to the selected row. In this case, sensing signals for each illumination, which are generated from the unit color pixels UCP of the selected row, are sequentially transmitted to the analog-to-digital converter 130.

The analog-to-digital converter 130 converts the sensing signals generated from the unit color pixels UCP into digital signals in response to a control signal TC2 from the timing controller 150. For example, the analog-to-digital converter 130 may perform an averaging operation on sensing signals of a certain illumination, which are generated from one or more unit color pixels UCP. For example, the analog-to-digital converter 130 may perform an analogue binning operation. The analog-to-digital converter 130 may sample HDR sensing signals in a correlated double sampling manner and may then convert the sampled HDR sensing signals into digital signals. To this end, a correlated double sampler (CDS) may be further included in front of the analog-to-digital converter 130.

The output buffer 140 may latch image data provided from the analog-to-digital converter 130 in the unit of column. The output buffer 140 may temporarily store image data output from the analog-to-digital converter 130 in response to a control signal TC3 from the timing controller 150 and may then output the latched image data sequentially by using a column decoder.

The timing controller 150 controls the pixel array 110, the row decoder 120, the analog-to-digital converter 130, the output buffer 140, etc. The timing controller 150 may supply control signals, such as a clock signal and a timing control signal, to the pixel array 110, the row decoder 120, the analog-to-digital converter 130, the output buffer 140, etc. The timing controller 150 may include a logic control circuit, a phase locked loop (PLL) circuit, a timing control circuit, a communication interface circuit, etc.

The configuration of the image sensor 100 according to an embodiment is briefly described above. In particular, as the unit color pixels UCP constituting the pixel array 110 are able to simultaneously output a plurality of sensing signals corresponding to the same illumination range, the averaging operation is possible. According to the above description, the image sensor 100 is able to perform the averaging operation on sensing signals at a high speed, thus improving a binning speed. According to an embodiment, it is possible to implement the image sensor 100 that provides a high frame rate in the HDR mode.

In another embodiment, because the unit color pixels UCP constituting the pixel array 110 simultaneously output a plurality of sensing signals corresponding to the same illumination range, it is possible to implement the HDR mode of a high resolution in the case of skipping the binning or averaging operation.

Figure 2:
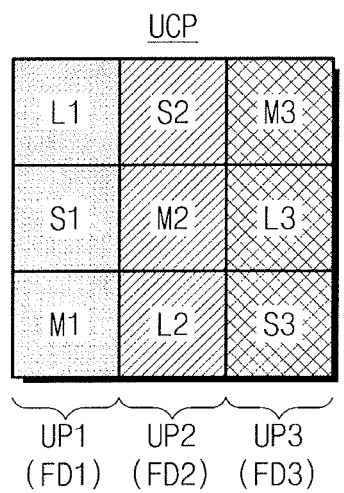
FIG. 2 illustrates a diagram of a unit color pixel in FIG. 1 according to an embodiment.

FIG. 2 is a diagram illustrating the unit color pixel UCP illustrated in FIG. 1. An example where one unit color pixel UCP includes a plurality of unit pixels UP and each unit pixel UP includes three sub-pixels SP will be described with reference to FIG. 2.

The unit color pixel UCP includes three unit pixels UP. The unit pixel UP may include three photoelectric conversion elements and one floating diffusion region FD. Here, one unit pixel UP includes three sub-pixels having different effective integration times EIT. For example, a sub-pixel L1 of a unit pixel UP1 is a sub-pixel having the longest effective integration time EIT from among three sub-pixels thereof. A sub-pixel S1 of the unit pixel UP1 is a sub-pixel having the shortest effective integration time EIT from among the three sub-pixels. A sub-pixel M1 of the unit pixel UP1 is a sub-pixel having a middle effective integration time EIT from among the three sub-pixels.

A unit pixel UP2 may have substantially the same structure as the unit pixel UP1, but may be different from the unit pixel UP1 in terms of the arrangement of sub-pixels and the order of allocating effective integration times. That is, a sub-pixel S2 in the first row of the unit pixel UP2 may have the shortest effective integration time EIT from among three sub-pixels thereof. A sub-pixel M2 in the second row of the unit pixel UP2 may have the middle effective integration time EIT from among the three sub-pixels. A sub-pixel L2 in the third row takes may have the longest effective integration time EIT of effective integration times of the three sub-pixels of the unit pixel UP2.

A unit pixel UP3 may have substantially the same structure as the unit pixels UP1 and UP2, but may be different from the unit pixels UP1 and UP2 in terms of the arrangement of sub-pixels and the order of allocating effective integration times. That is, a sub-pixel M3 placed in the first row of the unit pixel UP3 may have the middle effective integration time EIT from among three sub-pixels thereof. A sub-pixel L3 placed in the second row of the unit pixel UP3 may have the longest effective integration time EIT of effective integration times of the three sub-pixels. A sub-pixel S3 corresponding to the third row may take charge of the shortest effective integration time EIT of effective integration times of the three sub-pixels of the unit pixel UP3.

The unit color pixel UCP that performs the HDR mode sensing operation may include three unit pixels UP sharing a floating diffusion region. Each unit pixel UP may include three sub-pixels. Accordingly, a unit color pixel may have a pixel structure in which 3×3 pixels constituting three 1×3 unit pixels are arranged. Unit pixels may simultaneously output signals of sub-pixels having the same effective integration time EIT in the high dynamic range (HDR) sensing operation. Because the averaging operation can be performed on sensing signals output at the same time, high-speed binning and analog-to-digital conversion are possible.

Figure 3A:
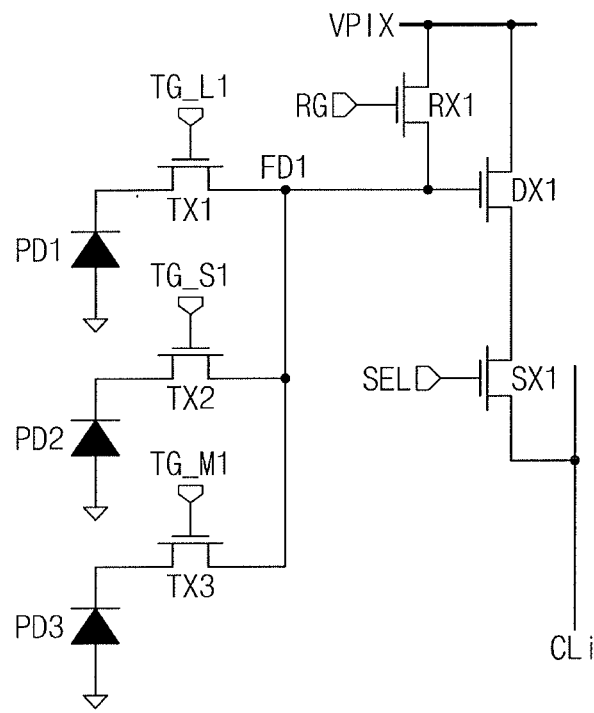
FIGS. 3A to 3C illustrate circuit diagrams of structures of unit pixels.
Figure 3B:
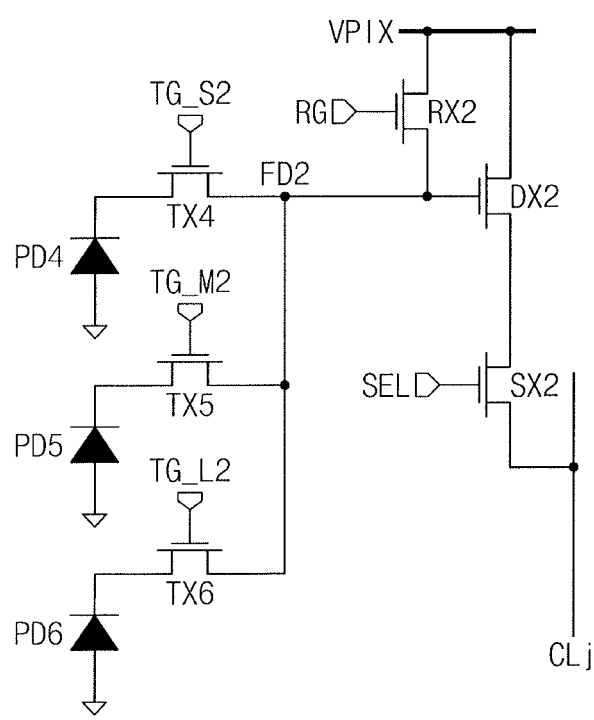
Figure 3C:
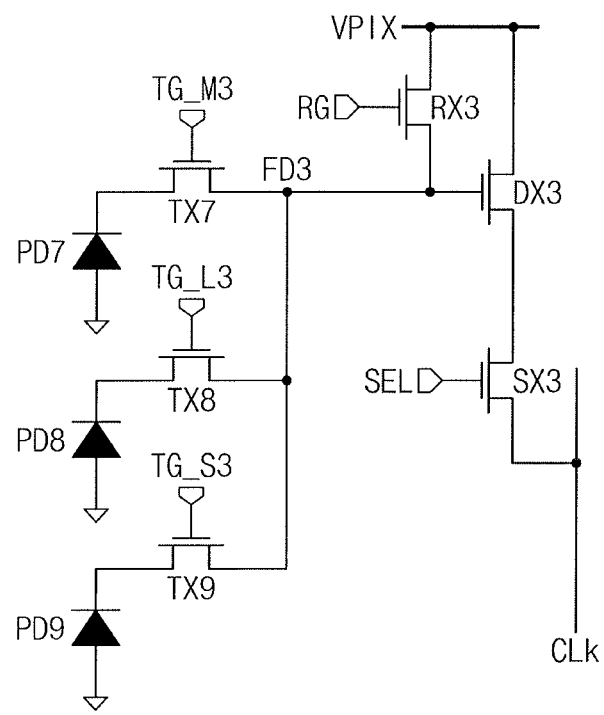

FIGS. 3A to 3C are circuit diagrams illustrating structures of unit pixels according to embodiments. Referring to FIG. 3A, the unit pixel UP1 may include a plurality of photoelectric conversion elements PD1, PD2, and PD3, a plurality of transmission transistors TX1, TX2, and TX3, a reset transistor RX1, a selection transistor SX1, and a drive transistor DX1. The unit pixel UP1 may further include a conversion gain transistor (CGX) and a capacitor (CAP) for implementing a conversion gain changing circuit.

In detail, the photoelectric conversion elements PD1, PD2, and PD3 may be photosensitive elements that generate and integrate charges depending on the amount of incident light or the intensity of the incident light. Each of the photoelectric conversion elements PD1, PD2, and PD3 may be a photo diode, a photo transistor, a photo gate, a pinned photo diode (PPD), or a combination thereof.

The transmission transistors TX1, TX2, and TX3 transmit charges integrated in the photoelectric conversion elements PD1, PD2, and PD3 connected thereto to a first charge detection node FD1 (i.e., a floating diffusion region). The transmission transistors TX1, TX2, and TX3 are controlled by charge transmission signals TG_L1, TG_S1, and TG_M1, respectively.

The transmitted photoelectrons may be accumulated at the first charge detection node FD1 having a capacity provided physically. The drive transistor DX1 may be controlled depending on the amount of photoelectrons accumulated at the first charge detection node FD1.

The reset transistor RX1 may reset charges accumulated at the first charge detection node FD1. In detail, a drain terminal of the reset transistor RX1 is connected to the first charge detection node FD1, and a source terminal thereof is connected to a pixel power supply voltage VPIX. When the reset transistor RX1 is turned on, the pixel power supply voltage VPIX connected to the source electrode of the reset transistor RX1 is supplied to the first charge detection node FD1. Accordingly, charges accumulated at the first charge detection node FD1 may be discharged when the reset transistor RX1 is turned on, and thus, the first charge detection node FD1 may be reset.

The drive transistor DX1 may be a source follower buffer amplifier that generates a source-drain current in proportion to the amount of charges of the first charge detection node FD1, which are input to a gate terminal of the drive transistor DX1. The drive transistor DX1 amplifies a potential change of the first charge detection node FD1 and outputs the amplified signal to a column line CLi through the selection transistor SX1. A source terminal of the drive transistor DX1 may be connected to the pixel power supply voltage VPIX, and a drain terminal of the drive transistor DX1 may be connected to a source terminal of the selection transistor SX1.

The selection transistor SX1 may select the unit pixels UP1 to be read in the unit of row. When the selection transistor SX1 is turned on by the selection signal SEL provided from the row decoder 120, an electrical signal output from the drain terminal of the drive transistor DX1 may be provided to the column line CLi through the selection transistor SX1.

A circuit structure of the unit pixel UP1 of a 1×3 pixel size for constituting the unit color pixel UCP of a 3×3 pixel size is described above. The unit pixel UP1 may accumulate charges by using one charge detection node (or a floating diffusion region) marked by "FD1".

Referring to FIG. 3B, the unit pixel UP2 may include a plurality of photoelectric conversion elements PD4, PD5, and PD6, a plurality of transmission transistors TX4, TX5, and TX6, a reset transistor RX2, a selection transistor SX2, and a drive transistor DX2. Also, referring to FIG. 3C, the unit pixel UP3 may include a plurality of photoelectric conversion elements PD7, PD8, and PD9, a plurality of transmission transistors TX7, TX8, and TX9, a reset transistor RX3, a selection transistor SX3, and a drive transistor DX3.

According to the above description, the unit color pixel UCP of the 3×3 pixel size includes unit pixels UP of the 1×3 pixel size capable of outputting sensing signals independently of each other. Accordingly, unit pixels corresponding to the same effective integration time EIT may output sensing signals at the same time. The output sensing signals may be merged through the averaging operation.

Figure 4:
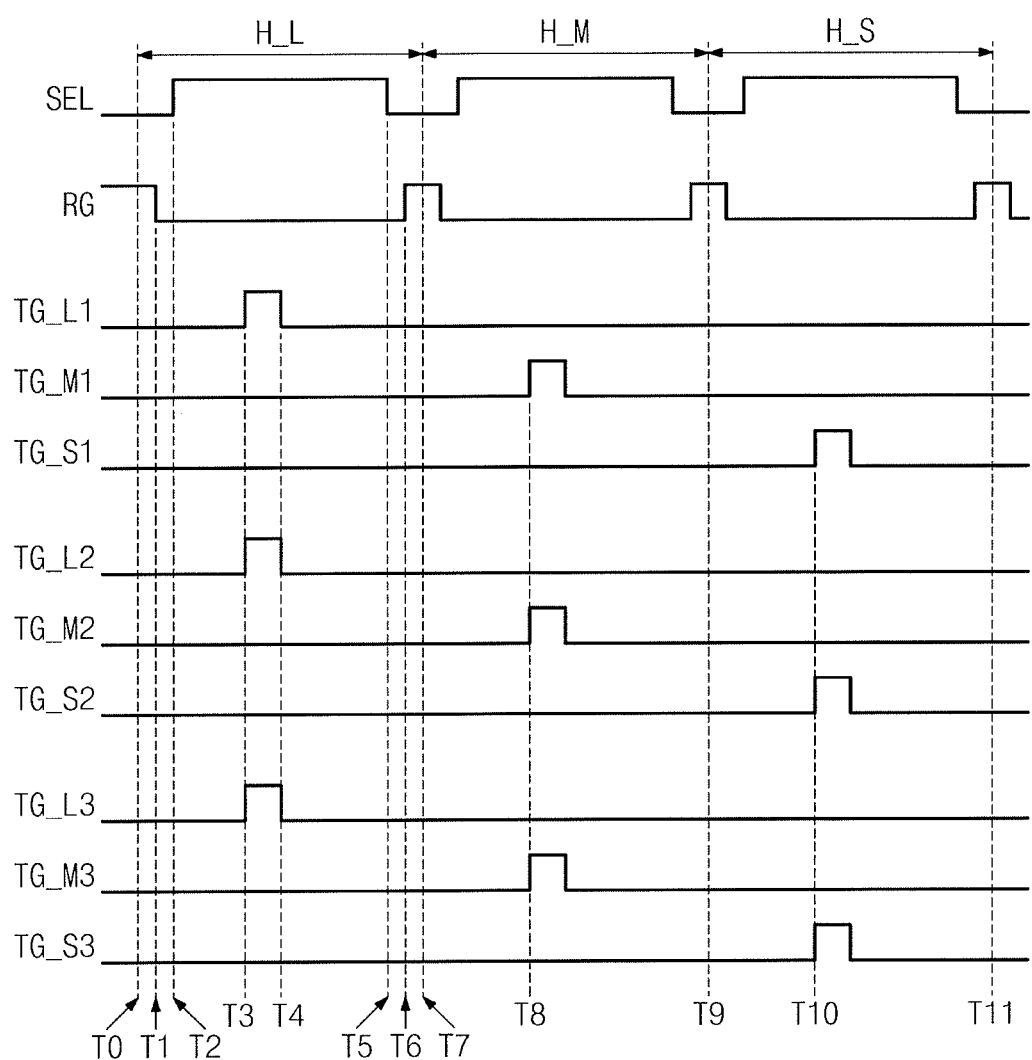
FIG. 4 illustrates a timing diagram of a control method for implementing a high dynamic range (HDR) of a unit color pixel according to an embodiment.

FIG. 4 is a timing diagram illustrating a control method for implementing a high dynamic range (HDR) of a unit color pixel according to an embodiment. Referring to FIG. 4, sensing signals corresponding to the same effective integration time EIT may be simultaneously output from a selected unit color pixel UCP. That is, from a time T0 to a time T6, charges integrated by the photoelectric conversion elements PD1, PD6, and PD8 having the longest effective integration time EIT for high-illumination sensing are sensed. From the time T6 to a time T9, charges integrated by the photoelectric conversion elements PD3, PD5, and PD7 having the middle effective integration time EIT for middle-illumination sensing are sensed. From the time T9 to a time T11, charges integrated by the photoelectric conversion elements PD2, PD4, and PD9 having the shortest effective integration time EIT for low-illumination sensing are sensed.

First, a control operation of the unit color pixel UCP for high-illumination sensing may be performed from the time T0 to the time T6. The reset signal RG is maintained at a high level from the time T0 to the time T1 for the purpose of resetting charge detection nodes FD1, FD2, and FD3 of the unit pixels UP1, UP2, and UP3. In this case, the reset transistors RX1, RX2, and RX3 are turned on. When the reset transistors RX1, RX2, and RX3 are turned on, charges accumulated at the charge detection nodes FD1, FD2, and FD3 may be discharged, and the charge detection nodes FD1, FD2, and FD3 may be reset.

At the time T1, the reset signal RG transitions to a low level. As the reset signal RG transitions to the low level, the reset transistors RX1, RX2, and RX3 are turned off. In this case, the charge detection nodes FD1, FD2, and FD3 may be in a state where charge accumulation is possible.

At the time T2, as the selection signal SEL transitions to the high level, the selection transistors SX1, SX2, and SX3 are turned on. In the case where the selection transistors SX1, SX2, and SX3 are turned on, it is possible to output sensing signals.

At the time T3, the transmission signals TG_L1, TG_L2, and TG_L3 transition to the high level for the purpose of turning on the transmission transistors TX1, TX6, and TX8 of the sub-pixels L1, L2, and L3 corresponding to the longest effective integration time. In this case, the remaining charge transmission signals TG_M1, TG_M2, TG_M3, TG_S1l, TG_S2, and TG_S3 may be maintained at the low level. During a high period (T3 to T4) of the charge transmission signals TG_L1, TG_L2, and TG_L3, photoelectrons integrated by the photoelectric conversion elements PD1, PD6, and PD8 are transmitted to the charge detection nodes FD1, FD2, and FD3. That is, the photoelectrons are accumulated at the charge detection nodes FD1, FD2, and FD3.

Between the time T4 and the time T5, currents flow through the drive transistors DX1, DX2, and DX3, the gate terminals of which are respectively connected to the charge detection nodes FD1, FD2, and FD3, in proportion to the amount of charges accumulated at the charge detection nodes FD1, FD2, and FD3. For example, the drive transistor DX1 of the unit pixel UP1 amplifies a potential change of the charge detection node FD1 and outputs the amplified signal to the column line CLi through the selection transistor SX1. Likewise, the drive transistor DX2 of the unit pixel UP2 amplifies a potential change of the charge detection node FD2 and outputs the amplified signal to the column line CLj through the selection transistor SX2, and the drive transistor DX3 of the unit pixel UP3 amplifies a potential change of the charge detection node FD3 and outputs the amplified signal to the column line CLk through the selection transistor SX3.

At the time T5, as the selection signal SEL transitions to the low level, the selection transistors SX1, SX2, and SX3 are turned off. In this case, sensing signals of the unit pixels UP1, UP2, and UP3 are blocked from being output.

At the time T6, as the reset signal RG transitions to the high level, the reset transistors RX1, RX2, and RX3 are turned on. When the reset transistors RX1, RX2, and RX3 are turned on, the charge detection nodes FD1, FD2, and FD3 of the unit pixels UP1, UP2, and UP3 are reset to the pixel power supply voltage VPIX.

A control operation for middle-illumination sensing is performed from the time T6 to the time T9. The transitions of the selection signal SEL and the reset signal RG from the time T6 to the time T9 are the same as those from the time T0 to the time T6, and thus, additional description will be omitted to avoid redundancy. In a state where the reset signal RG transitions to the low level and the selection signal SEL transitions to the high level, photoelectrons corresponding to an incident light are integrated by the photoelectric conversion elements PD3, PD5, and PD7 having the effective integration time EIT of a middle length.

At the time T8, the transmission signals TG_M1, TG_M2, and TG_M3 transition to the high level for the purpose of turning on the transmission transistors TX3, TX5, and TX7 of the sub-pixels M1, M2, and M3 corresponding to the effective integration time of the middle length. During a high period of the charge transmission signals TG_M1, TG_M2, and TG_M3, the photoelectrons integrated by the photoelectric conversion elements PD3, PD5, and PD7 are transmitted to the charge detection nodes FD1, FD2, and FD3. That is, the photoelectrons are accumulated at the charge detection nodes FD1, FD2, and FD3. Then, currents flow through the drive transistors DX1, DX2, and DX3, the gate terminals of which are respectively connected to the charge detection nodes FD1, FD2, and FD3, in proportion to the amount of charges accumulated at the charge detection nodes FD1, FD2, and FD3. For example, the drive transistor DX2 of the unit pixel UP2 amplifies a potential change of the charge detection node FD2 and outputs the amplified signal to the column line CLj through the selection transistor SX2. Likewise, the drive transistor DX1 of the unit pixel UP1 amplifies a potential change of the charge detection node FD1 and outputs the amplified signal to the column line CLi through the selection transistor SX3, and the drive transistor DX3 of the unit pixel UP3 amplifies a potential change of the charge detection node FD3 and outputs the amplified signal to the column line CLk through the selection transistor SX3.

A control operation for low-illumination sensing is performed from the time T9 to the time T11. After the time T9, in a state where the reset signal RG transitions to the low level and the selection signal SEL transitions to the high level, photoelectrons corresponding to an incident light are integrated by the photoelectric conversion elements PD2, PD4, and PD9 having the effective integration time EIT of the shortest length.

At the time T10, the transmission signals TG_S1, TG_S2, and TG_S3 transition to the high level for the purpose of turning on the transmission transistors TX2, TX4, and TX9 of the sub-pixels S1, S2, and S3 corresponding to the shortest effective integration time. During a high period of the charge transmission signals TG_S1, TG_S2, and TG_S3, the photoelectrons integrated by the photoelectric conversion elements PD2, PD4, and PD9 are transmitted to the charge detection nodes FD1, FD2, and FD3. That is, the photoelectrons are accumulated at the charge detection nodes FD1, FD2, and FD3. Then, currents flow through the drive transistors DX1, DX2, and DX3, the gate terminals of which are respectively connected to the charge detection nodes FD1, FD2, and FD3, in proportion to the amount of charges accumulated at the charge detection nodes FD1, FD2, and FD3. For example, the drive transistor DX3 of the unit pixel UP3 amplifies a potential change of the charge detection node FD3 and outputs the amplified signal to the column line CLk through the selection transistor SX3. Likewise, the drive transistor DX1 of the unit pixel UP1 amplifies a potential change of the charge detection node FD1 and outputs the amplified signal to the column line CLi through the selection transistor SX2, and the drive transistor DX2 of the unit pixel UP2 amplifies a potential change of the charge detection node FD2 and outputs the amplified signal to the column line CLj through the selection transistor SX2.

An example in which sensing signals are able to be simultaneously output from sub-pixels of the unit color pixel UCP in the HDR mode is described above. The sensing signals output from the unit pixels UP1, UP2, and UP3 make it possible to perform the averaging operation. Accordingly, the frame rate of the image sensor 100 according to an embodiment may be improved in the high dynamic range (HDR) mode.

FIG. 5 is a flowchart illustrating a high dynamic range (HDR) sensing method of an image sensor according to an embodiment. Referring to FIG. 5, sensing signals corresponding to the same effective integration time EIT may be simultaneously output through the charge detection nodes FD1, FD2, and FD3 independently provided in the unit color pixel UCP.

In operation S110, one unit color pixel UCP may be selected through the row decoder 120 of the image sensor 100. A plurality of unit color pixels present in the same row may be simultaneously selected.

In operation S120, a high-illumination mode (HIM) sensing operation is performed on the selected unit color pixel UCP. The high-illumination mode (HIM) sensing operation may refer to an operation of sensing sub-pixels having the longest effective integration time EIT from among sub-pixels of the unit color pixel UCP. For example, photoelectrons integrated by the photoelectric conversion elements PD1, PD6, and PD8 of the high-illumination sub-pixels L1, L2, and L3 of FIG. 2 corresponding to the longest effective integration time EIT are accumulated at the charge detection nodes FD1, FD2, and FD3. Afterwards, sensing signals corresponding to the charges accumulated at the charge detection nodes FD1, FD2, and FD3 may be simultaneously output to the column lines CLi, CLj, and CLk.

In operation S130, a middle-illumination mode (MIM) sensing operation is performed on the selected unit color pixel UCP. The middle-illumination mode (MIM) sensing operation may refer to an operation of sensing sub-pixels having the middle effective integration time EIT from among the sub-pixels of the unit color pixel UCP. For example, referring to FIGS. 2 and 3A to 3C, photoelectrons integrated in the photoelectric conversion elements PD3, PD5, and PD7 of the middle-illumination sub-pixels M1, M2, and M3 of FIG. 2 corresponding to the middle effective integration time EIT are accumulated at the charge detection nodes FD1, FD2, and FD3. Afterwards, sensing signals corresponding to the charges accumulated at the charge detection nodes FD1, FD2, and FD3 may be simultaneously output to the column lines CLi, CLj, and CLk.

In operation S140, low-illumination mode (LIM) sensing operation is performed on the selected unit color pixel UCP. The low-illumination mode (LIM) sensing operation may refer to an operation of sensing sub-pixels having the shortest effective integration time EIT from among the sub-pixels of the unit color pixel UCP. For example, referring to FIGS. 2 and 3A to 3C, photoelectrons integrated by the photoelectric conversion elements PD2, PD4, and PD9 of the low-illumination sub-pixels S1, S2, and S3 of FIG. 2 corresponding to the middle effective integration time EIT are accumulated at the charge detection nodes FD1, FD2, and FD3. Afterwards, sensing signals corresponding to the charges accumulated at the charge detection nodes FD1, FD2, and FD3 may be simultaneously output to the column lines CLi, CLj, and CLk.

In operation S150, a binning operation is performed on the sensing signals output from the selected unit color pixel UCP. For example, the averaging operation may be performed on the high-illumination mode sensing signals simultaneously output from the selected unit color pixel UCP. Alternatively, the averaging operation may be performed on sensing signals output from a plurality of unit color pixels UCP corresponding to the same color. Unit color pixels UCP that are present in the same row or in the same column may be selected as the plurality of unit color pixels UCP targeted for the averaging operation. Alternatively, the plurality of unit color pixels UCP targeted for the averaging operation may be selected from groups of unit color pixels UCP that correspond to the same color and are distributed in a given region.

In operation S160, a sensing signal processed through the binning operation is converted into digital data. Afterwards, a high dynamic range (HDR) image may be generated by combining pieces of image data corresponding to the low illumination mode (LIM), the middle illumination mode (MIM), and the high illumination mode (HIM).

A way to generate the HDR image by using an image sensor of a unit color pixel (UCP) structure according to embodiments is described above. In the unit color pixel (UCP) structure according to embodiments, sensing signals corresponding to the same illumination may be simultaneously output, and the simultaneously output sensing signals may be processed through the averaging operation such as addition or subtraction. According to the unit color pixel (UCP) structure, a time taken for image sensing of the HDR mode is markedly decreased, and the HDR image may be obtained with a high frame rate.

Figure 6A:
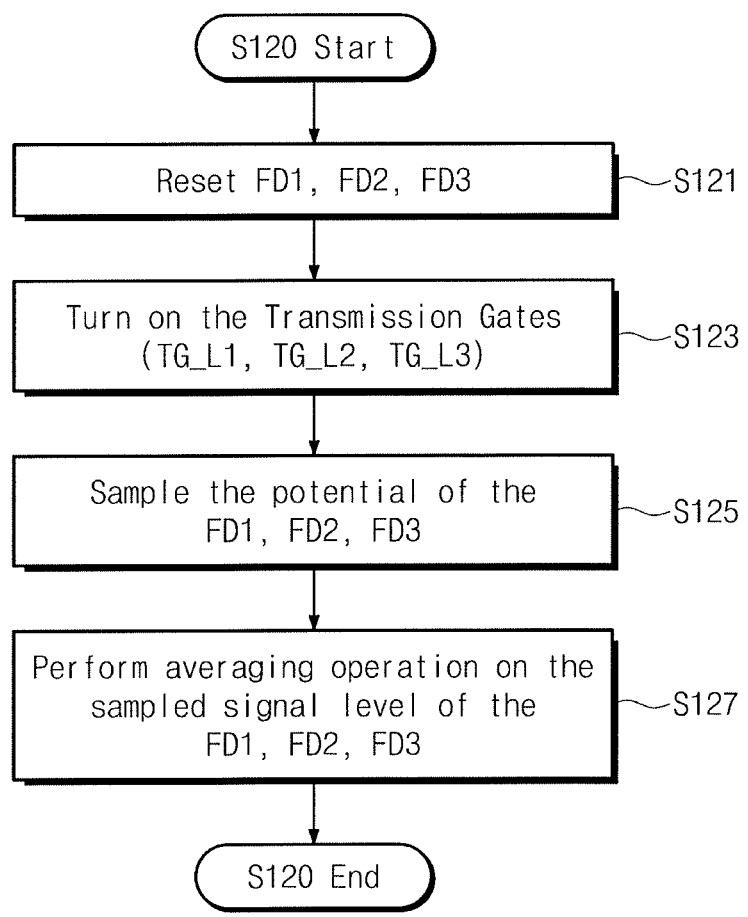
FIGS. 6A, 6B, and 6C illustrate flowcharts describing a high illumination mode, a middle illumination mode, and a low illumination mode of FIG. 5, respectively.
Figure 6B:
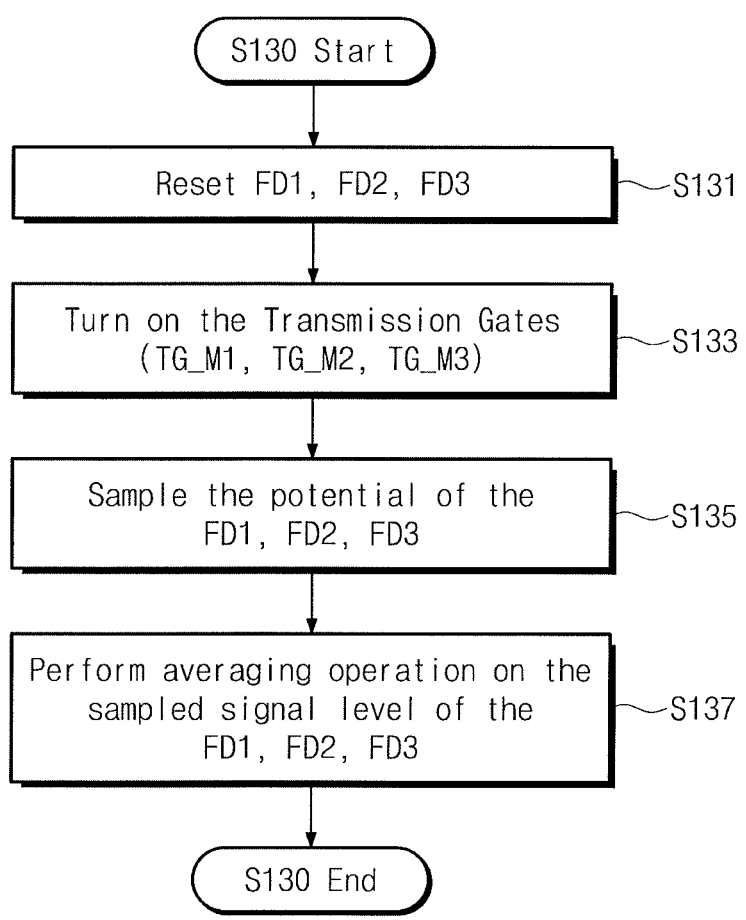
Figure 6C:
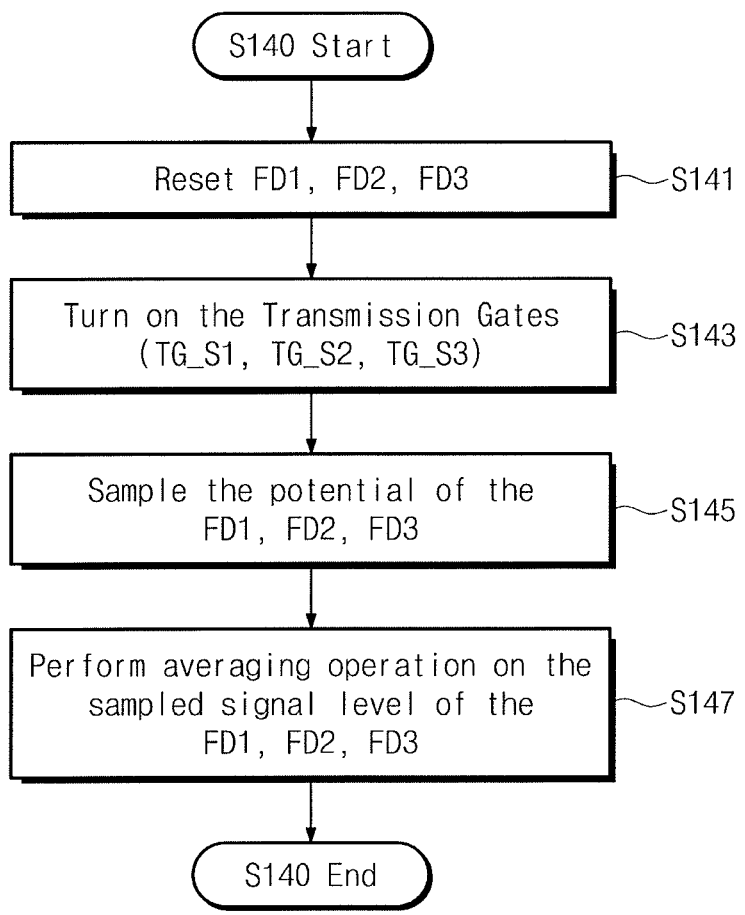

FIGS. 6A, 6B, and 6C are flowcharts for describing a high illumination mode, a middle illumination mode, and a low illumination mode of FIG. 5, respectively. Operation S120 corresponding to the high-illumination mode (HIM) sensing operation will be more fully described with reference to FIGS. 6A and 5.

In operation S121, the charge detection nodes FD1, FD2, and FD3 of the unit pixels UP1, UP2, and UP3 are reset to perform the high-illumination mode (HIM) sensing operation on the selected unit color pixel UCP. To this end, the reset signal RG is set to the high level, and reset transistors, for example, the reset transistors RX1, RX2, and RX3 of the unit pixels UP1, UP2, and UP3 are turned on by the reset signal RG. When the reset transistors RX1, RX2, and RX3 are turned on, charges present at the charge detection nodes FD1, FD2, and FD3 are discharged to a pixel power supply voltage (VPIX) terminal. As a result, voltages of the charge detection nodes FD1, FD2, and FD3 may be reset to a level of the pixel power supply voltage VPIX.

In operation S123, the charge transmission signals TG_L1, TG_L2, and TG_L3 transition to the high level. In this case, photoelectrons integrated by the photoelectric conversion elements PD1, PD6, and PD8 are accumulated at the charge detection nodes FD1, FD2, and FD3.

In operation S125, currents flow through the drive transistors DX1, DX2, and DX3, the gate terminals of which are respectively connected to the charge detection nodes FD1, FD2, and FD3, in proportion to the amount of charges accumulated at the charge detection nodes FD1, FD2, and FD3. A voltage level corresponding to the amount of charges accumulated at each of the charge detection nodes FD1, FD2, and FD3 is amplified as a source-drain current of each of the drive transistors DX1, DX2, and DX3. The amplified signals may be output to the column lines CLi, CLj, and CLk through the selection transistors SX1, SX2, and SX3.

In operation S127, the averaging operation may be performed on the high-illumination mode sensing signals output to the column lines CLi, CLj, and CLk. For example, the high-illumination mode sensing signals output to the column lines CLi, CLj, and CLk may be merged to one sensing signal.

According to the high-illumination mode sensing method corresponding to operation S120, a plurality of sub-pixels that perform a sensing operation in the high illumination mode may simultaneously output sensing signals. In addition, as the averaging operation is performed on the output sensing signals, it is possible to perform a sensing operation at a high speed in the high-dynamic range (HDR) mode, and it is possible to improve a frame rate.

Operation S130 corresponding to the middle-illumination mode (MIM) sensing operation will be more fully described with reference to FIGS. 6B and 5.

In operation S131, the charge detection nodes FD1, FD2, and FD3 of the unit pixels UP1, UP2, and UP3 are reset to perform the middle-illumination mode (MIM) sensing operation on the selected unit color pixel UCP. As the reset transistors RX1, RX2, and RX3 are turned on in response to the reset signal RG transitioning to the high level, charges present at the charge detection nodes FD1, FD2, and FD3 are discharged to the pixel power supply voltage (VPIX) terminal. As a result, voltages of the charge detection nodes FD1, FD2, and FD3 may be reset to a level of the pixel power supply voltage VPIX.

In operation S133, the charge transmission signals TG_M1, TG_M2, and TG_M3 transition to the high level. In this case, photoelectrons integrated by the photoelectric conversion elements PD3, PD5, and PD7 are accumulated at the charge detection nodes FD1, FD2, and FD3.

In operation S135, currents flow through the drive transistors DX1, DX2, and DX3, the gate terminals of which are respectively connected to the charge detection nodes FD1, FD2, and FD3, in proportion to the amount of charges accumulated at the charge detection nodes FD1, FD2, and FD3. A voltage level corresponding to the amount of charges accumulated at each of the charge detection nodes FD1, FD2, and FD3 is amplified as a source-drain current of each of the drive transistors DX1, DX2, and DX3. The amplified signals may be output to the column lines CLi, CLj, and CLk through the selection transistors SX1, SX2, and SX3.

In operation S137, the averaging operation may be performed on the middle-illumination mode sensing signals output to the column lines CLi, CLj, and CLk. For example, the middle-illumination mode sensing signals output to the column lines CLi, CLj, and CLk may be merged to one sensing signal.

According to the middle-illumination mode sensing method corresponding to operation S130, a plurality of sub-pixels that perform a sensing operation in the middle illumination mode may simultaneously output sensing signals. In addition, as the averaging operation is performed on the output sensing signals, it is possible to perform a sensing operation at a high speed in the high-dynamic range (HDR) mode, and it is possible to improve a frame rate.

Operation S140 corresponding to the low-illumination mode (LIM) sensing operation will be more fully described with reference to FIGS. 6C and 5.

In operation S141, the charge detection nodes FD1, FD2, and FD3 of the unit pixels UP1, UP2, and UP3 are reset to perform the low-illumination mode (LIM) sensing operation on the selected unit color pixel UCP. As the reset transistors RX1, RX2, and RX3 are turned on in response to the reset signal RG transitioning to the high level, charges present at the charge detection nodes FD1, FD2, and FD3 are discharged to the pixel power supply voltage (VPIX) terminal. As a result, voltages of the charge detection nodes FD1, FD2, and FD3 may be reset to a level of the pixel power supply voltage VPIX.

In operation S143, the charge transmission signals TG_S1, TG_S2, and TG_S3 transition to the high level. In this case, photoelectrons integrated by the photoelectric conversion elements PD2, PD4, and PD9 are accumulated at the charge detection nodes FD1, FD2, and FD3.

In operation S145, currents flow through the drive transistors DX1, DX2, and DX3, the gate terminals of which are respectively connected to the charge detection nodes FD1, FD2, and FD3, in proportion to the amount of charges accumulated at the charge detection nodes FD1, FD2, and FD3. A voltage level corresponding to the amount of charges accumulated at each of the charge detection nodes FD1, FD2, and FD3 is amplified as a source-drain current of each of the drive transistors DX1, DX2, and DX3. The amplified signals may be output to the column lines CLi, CLj, and CLk through the selection transistors SX1, SX2, and SX3.

In operation S147, the averaging operation may be performed on the low illumination mode sensing signals output to the column lines CLi, CLj, and CLk. For example, the low illumination mode sensing signals output to the column lines CLi, CLj, and CLk may be merged to one sensing signal.

According to the low-illumination mode sensing method corresponding to operation S140, a plurality of sub-pixels that perform a sensing operation in the low illumination mode may simultaneously output sensing signals. In addition, as the averaging operation is performed on the output sensing signals, it is possible to perform a sensing operation at a high speed in the high dynamic range (HDR) mode, and it is possible to improve a frame rate.

Figure 7:
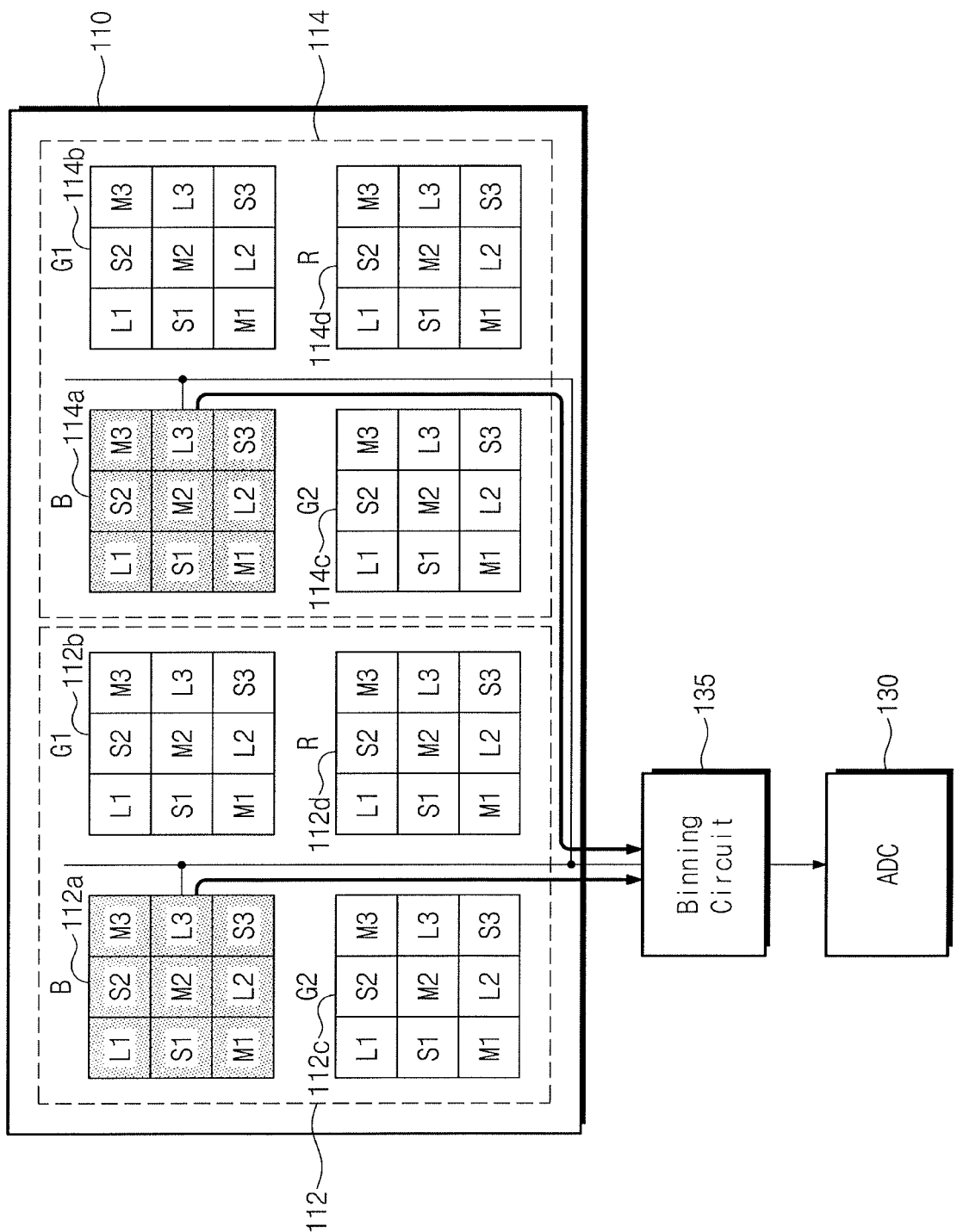
FIG. 7 illustrates image signals sensed from a unit color pixel according to an embodiment.

FIG. 7 illustrates another embodiment in which image signals sensed from a unit color pixel are processed. Referring to FIG. 7, a simultaneous sensing and readout operation of sub-pixels having the same effective integration time EIT may be performed on the unit color pixels UCP disposed in the same row.

The pixel array 110 may include a plurality of unit pixel groups (UPG) 112 and 114 including a plurality of unit color pixels 112a to 112d and 114a to 114d according to embodiments. Here, a unit pixel group UPG means a combination of unit color pixels UCP respectively corresponding to colors "R", G1, G2, and "B" to be sensed. Unit color pixels 112a and 114a may be selected from the unit pixel groups 112 and 114. A sensing operation of the high dynamic range (HDR) mode may be performed on the unit color pixels 112a and 114a.

In the sensing operation of the high dynamic range (HDR) mode associated with the unit color pixels 112a and 114a, the averaging operation may be performed on sub-pixels of two unit color pixels. That is, high-illumination mode sensing signals sensed from the sub-pixels L1, L2, and L3 of the unit color pixel 112a and high-illumination mode sensing signals sensed from the sub-pixels L1, L2, and L3 of the unit color pixel 114a may be output to a binning circuit 135. The binning circuit 135 may perform the averaging operation on the high-illumination mode sensing signals of the sub-pixels L1, L2, and L3 included in the unit color pixels 112a and 114a.

The high-illumination mode sensing signals output from the unit color pixels 112a and 114a are converted into digital image data by the analog-to-digital converter 130 after being processed by the binning circuit 135. As a result, in the high dynamic range (HDR) sensing mode, 1×1 pixel data may be generated based on a sensing result of two unit color pixels 112a and 114a each having a 3×3 pixel size. The HDR sensing and binning operation that is performed in the unit of a plurality of unit color pixels 112a and 114b may be identically applied to the unit color pixels 112b and 114b. Also, an HDR sensing and binning operation that is performed in the unit of a plurality of unit color pixels 112a and 114a may be identically applied to the unit color pixels 112c and 114c and the unit color pixels 112d and 114d.

Figure 8:
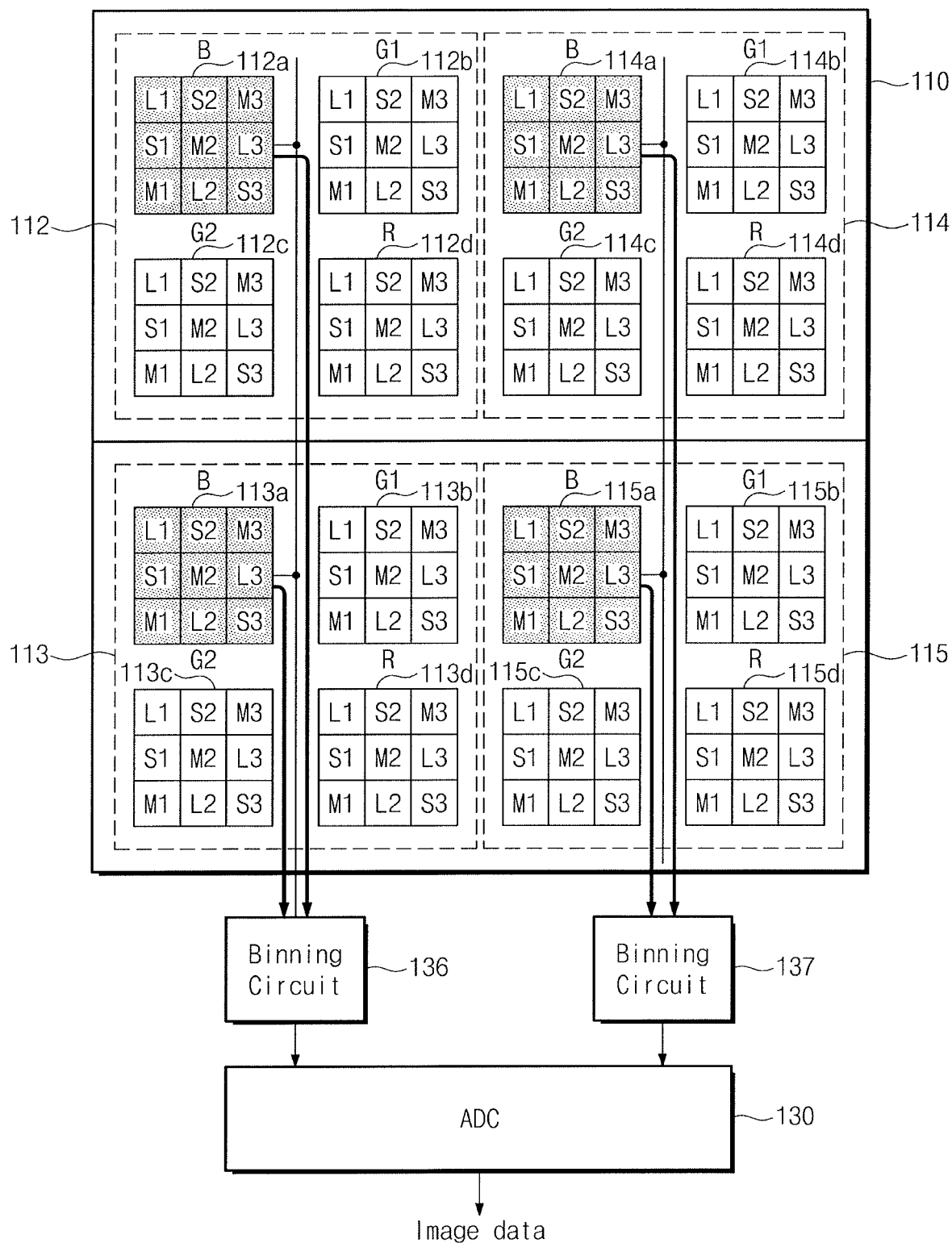
FIG. 8 illustrates image signals sensed from a unit color pixel according to an embodiment.

FIG. 8 illustrates another embodiment in which image signals sensed from a unit color pixel are processed. Referring to FIG. 8, a simultaneous sensing and readout operation of sub-pixels having the same effective integration time EIT may be performed on the unit color pixels UCP disposed in the same column.

The pixel array 110 may include a plurality of unit pixel groups 112, 113, 114, and 115 including a plurality of unit color pixels 112a to 112d, 113a to 113d, 114a to 114d, and 115a to 115d according to embodiments. Unit color pixels 112a, 113a, 114a, and 115a may be selected from the unit pixel groups 112, 113, 114, and 115 for the high dynamic range (HDR) sensing mode.

In the sensing operation of the high dynamic range (HDR) mode associated with the unit color pixels 112a and 113a present in the same column, the averaging operation may be performed on sub-pixels of two unit color pixels. That is, high-illumination mode sensing signals sensed from the sub-pixels L1, L2, and L3 of the unit color pixel 112a and high-illumination mode sensing signals sensed from the sub-pixels L1, L2, and L3 of the unit color pixel 113a may be output to a binning circuit 136. The binning circuit 136 may perform the averaging operation on the high illumination mode sensing signals of the sub-pixels L1, L2, and L3 included in the unit color pixels 112a and 113a.

In the sensing operation of the high dynamic range (HDR) mode associated with the unit color pixels 114a and 115a present in the same column, the averaging operation may be performed on sub-pixels of two unit color pixels. That is, high-illumination mode sensing signals sensed from the sub-pixels L1, L2, and L3 of the unit color pixel 114a and high-illumination mode sensing signals sensed from the sub-pixels L1, L2, and L3 of the unit color pixel 115a may be output to a binning circuit 137. The binning circuit 137 may perform the averaging operation on the high-illumination mode sensing signals of the sub-pixels L1, L2, and L3 included in the unit color pixels 114a and 115a.

The high-illumination mode sensing signals output from the unit color pixels 112a, 113a, 114a, and 115a are converted into digital image data by the analog-to-digital converter 130 after being processed by the binning circuits 136 and 137. As a result, in the high dynamic range (HDR) sensing mode, 1×1 pixel data may be generated based on a sensing result of two unit color pixels 112a and 113a each having a 3×3 pixel size and present in the same column. The column-based HDR sensing and binning operation may be identically applied to the remaining unit color pixels.

Figure 9:
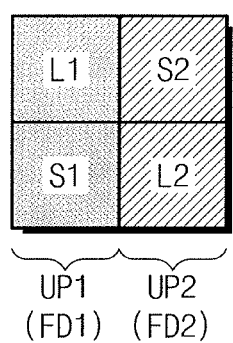
FIG. 9 illustrates a unit color pixel in FIG. 1 according to another embodiment.

FIG. 9 is a diagram illustrating another example of the unit color pixel UCP illustrated in FIG. 1. Referring to FIG. 9, the unit color pixel UCP may include two unit pixels UP1 and UP2 each including two sub-pixels. That is, the unit color pixel UCP may be implemented with 2×2 pixels constituting two unit pixels each having a 1×2 pixel size.

The one unit color pixel UCP includes the two unit pixels UP1 and UP2. Each of the unit pixels UP1 and UP2 includes two sub-pixels. The unit pixel UP1 may include sub-pixels L1 and S1 and one charge detection node FD1. The sub-pixels L1 and S1 having different effective integration times EIT correspond to photoelectric conversion elements PD1 and PD2. The unit pixel UP2 may include sub-pixels S2 and L2 and one charge detection node FD2. The sub-pixels S2 and L2 correspond to photoelectric conversion elements PD3 and PD4.

Here, sub-pixels correspond to different effective integration times EIT. For example, the sub-pixel L1 of the unit pixel UP1 may have a relatively long effective integration time EIT for high-illumination mode sensing. The sub-pixel S1 of the unit pixel UP1 has an effective integration time EIT shorter than the sub-pixel L1. The unit pixel UP2 may have substantially the same structure as the unit pixel UP1. That is, the sub-pixel S2 placed in the first row of the unit pixel UP2 may have a short effective integration time EIT. The sub-pixel L2 placed in the second row of the unit pixel UP2 may have a long effective integration time EIT.

The unit color pixel UCP that performs the HDR mode sensing operation according to embodiments includes two unit pixels UP, in each of which a charge detection node is shared. Each unit pixel UP may include two sub-pixels. Accordingly, a unit color pixel may have a pixel structure of a 2×2 pixel size, in which two unit pixels each having a 1×2 pixel size are arranged. In this structure, unit pixels according to embodiments may output signals of sub-pixels having the same effective integration time EIT in the HDR mode sensing operation. Because the averaging operation is able to be performed on the output sensing signals, high-speed binning and analog-to-digital conversion are possible.

Figure 10A:
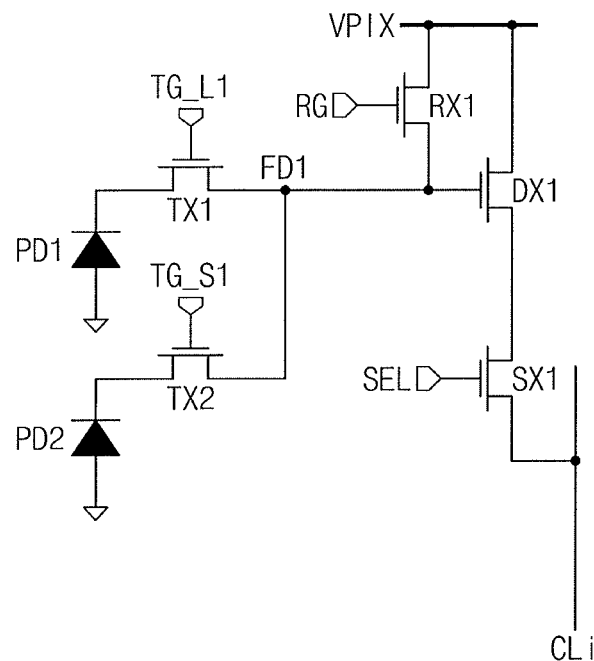
FIGS. 10A and 10B illustrate circuit diagrams of structures of unit pixels illustrated in FIG. 9.
Figure 10B:
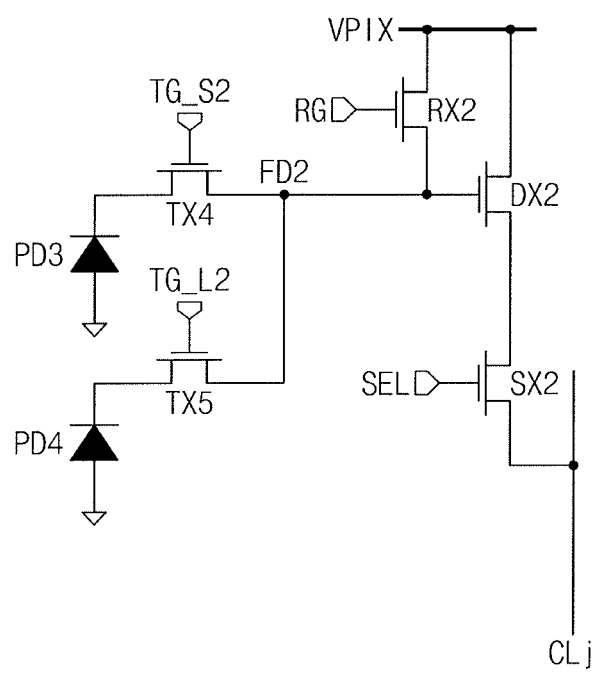

FIGS. 10A and 10B are circuit diagrams illustrating structures of unit pixels illustrated in FIG. 9. Referring to FIG. 10A, the unit pixel UP1 of a 1×2 pixel size may include a plurality of photoelectric conversion elements PD1 and PD2, a plurality of transmission transistors TX1 and TX2, the reset transistor RX1, the selection transistor SX1, and the drive transistor DX1. The plurality of photoelectric conversion elements PD1 and PD2, the plurality of transmission transistors TX1 and TX2, the reset transistor RX1, the selection transistor SX1, and the drive transistor DX1 are substantially the same as those of FIG. 3A. With regard to functions thereof, thus, additional description will be omitted to avoid redundancy.

The HDR mode sensing operation corresponding to two effective integration times EIT may be performed on the unit pixel UP1 of the 1×2 pixel size. That is, with regard to the unit pixel UP1 of the 1×2 pixel size, the HDR mode sensing operation is possible in two modes, i.e., the high illumination mode and the low illumination mode, by using the transmission signals TG_L1 and TG_S1.

Referring to FIG. 10B, the unit pixel UP2 of a 1×2 pixel size may include a plurality of photoelectric conversion elements PD3 and PD4, a plurality of transmission transistors TX3 and TX4, the reset transistor RX2, the selection transistor SX2, and the drive transistor DX2. The plurality of photoelectric conversion elements PD3 and PD4, the plurality of transmission transistors TX3 and TX4, the reset transistor RX2, the selection transistor SX2, and the drive transistor DX2 are substantially the same as those of FIG. 3B. With regard to functions thereof, thus, additional description will be omitted to avoid redundancy.

According to the description given with reference to FIGS. 10A and 10B, the unit color pixel UCP of the 2×2 pixel size includes unit pixels UP of the 1×2 pixel size capable of outputting sensing signals independently of each other. Accordingly, the unit color pixel UCP may perform the HDR mode sensing operation in two modes, i.e., the high illumination mode and the low illumination mode. In addition, it is possible to perform the averaging operation on high-illumination mode sensing signals or low-illumination mode sensing signals that are simultaneously output from respective unit pixels. Accordingly, a frame rate may be improved in the HDR mode sensing operation by adopting an image sensor according to embodiments.

Figure 11:
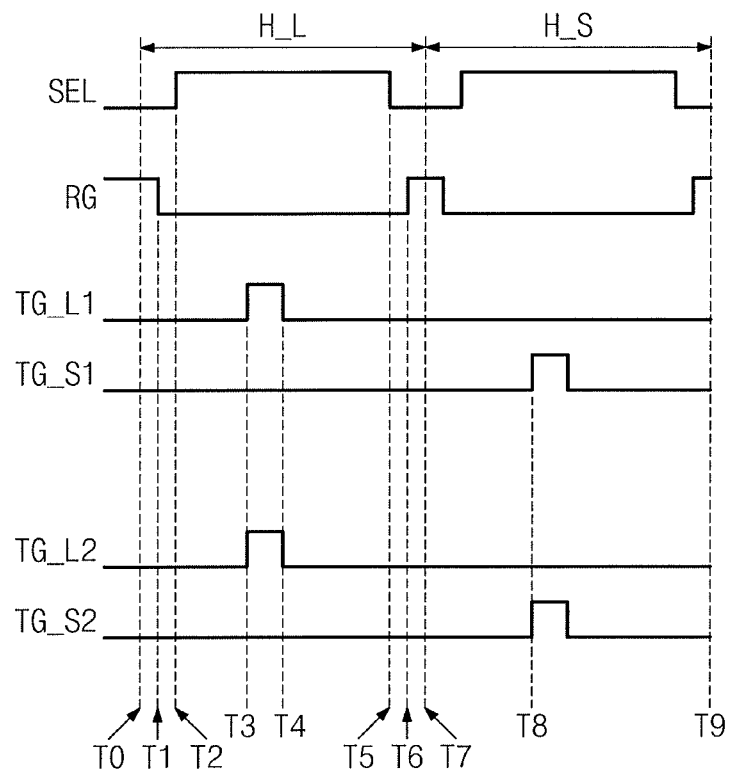
FIG. 11 illustrates a timing diagram of a control method for performing an HDR sensing operation on a unit color pixel having a 2×2 pixel size in FIGS. 10A and 10B.

FIG. 11 is a timing diagram illustrating a control method for performing an HDR mode sensing operation on a unit color pixel having a 2×2 pixel size illustrated in FIGS. 10A and 10B. Referring to FIG. 11, in a selected unit color pixel UCP, sensing signals corresponding to the same effective integration time EIT may be simultaneously accumulated at the charge detection nodes FD1 and FD2. From the time T0 to the time T6, charges integrated by the photoelectric conversion elements PD1 and PD4 for high-illumination sensing are sensed. From the time T6 to the time T9, charges integrated by the photoelectric conversion elements PD2 and PD3 for low-illumination sensing are sensed.

First, a control operation of the unit color pixel UCP for high-illumination sensing may be performed from the time T0 to the time T6. The reset signal RG is maintained at the high level from the time T0 to the time T1 for the purpose of resetting charge detection nodes FD1 and FD2 of the unit pixels UP1 and UP2. In this case, the reset transistors RX1 and RX2 are turned on, and the charge detection nodes FD1 and FD2 are reset.

At the time T1, the reset signal RG transitions to the low level. The reset transistors RX1 and RX2 may be turned off in response to the reset signal RG transitioning to the low level, and the charge detection nodes FD1 and FD2 may be set to a state capable of accumulating charges.

At the time T2, as the selection signal SEL transitions to the high level, the selection transistors SX1 and SX1 are turned on in response to the selection signal SEL transitioning to the high level, and the output of sensed data is possible.

At the time T3, the transmission signals TG_L1 and TG_L2 transition to the high level for the purpose of turning on the transmission transistors TX1 and TX4 of the sub-pixels L1 and L2. In this case, the remaining charge transmission signals TG_S1 and TG_S2 may be maintained at the low level. During a high period (T3 to T4) of the charge transmission signals TG_L1 and TG_L2, photoelectrons integrated by the photoelectric conversion elements PD1 and PD4 are transmitted to the charge detection nodes FD1 and FD2. That is, the photoelectrons are accumulated at the charge detection nodes FD1 and FD2.

Between the time T4 and the time T5, currents flow through the drive transistors DX1 and DX2, the gate terminals of which are respectively connected to the charge detection nodes FD1 and FD2, in proportion to the amount of charges accumulated at the charge detection nodes FD1 and FD2. For example, the drive transistor DX1 of the unit pixel UP1 amplifies a potential change of the charge detection node FD1 and outputs the amplified signal to the column line CLi through the selection transistor SX1. Likewise, the drive transistor DX2 of the unit pixel UP2 amplifies a potential change of the charge detection node FD2 and outputs the amplified signal to the column line CLj through the selection transistor SX2.

At the time T5, as the selection signal SEL transitions to the low level, the selection transistors SX1 and SX2 are turned off. In this case, sensing signals of the unit pixels UP1 and UP2 are blocked from being output.

At the time T6, as the reset signal RG transitions to the high level, the reset transistors RX1 and RX2 are turned on. When the reset transistors RX1 and RX2 are turned on, the charge detection nodes FD1 and FD2 of the unit pixels UP1 and UP2 are reset to the pixel power supply voltage VPIX.

A control operation for low-illumination sensing is performed from the time T6 to the time T9. The transitions of the selection signal SEL and the reset signal RG from the time T6 to the time T9 are the same as those from the time T0 to the time T6, and thus, additional description will be omitted to avoid redundancy. In a state where the reset signal RG transitions to the low level and the selection signal SEL transitions to the high level, photoelectrons corresponding to an incident light are integrated by the photoelectric conversion elements PD2 and PD3 provided for the low-illumination sensing operation.

At the time T8, the transmission signals TG_S1 and TG_S2 transition to the high level for the purpose of turning on the transmission transistors TX2 and TX3 of the sub-pixels S1 and S2 provided for the low-illumination mode sensing operation. During a high period of the charge transmission signals TG_S1 and TG_S2, photoelectrons integrated by the photoelectric conversion elements PD2 and PD3 are transmitted to the charge detection nodes FD1 and FD2. That is, the photoelectrons are accumulated at the charge detection nodes FD1 and FD2. Then, currents flow through the drive transistors DX1 and DX2, the gate terminals of which are respectively connected to the charge detection nodes FD1 and FD2, in proportion to the amount of charges accumulated at the charge detection nodes FD1 and FD2. For example, the drive transistor DX2 of the unit pixel UP2 amplifies a potential change of the charge detection node FD2 and outputs the amplified signal to the column line CLj through the selection transistor SX2.

A way to sense the unit color pixel UCP of the 2×2 pixel size in the high dynamic range (HDR) mode is described above. That signals sensed from a plurality of sub-pixels in the high illumination mode or the low illumination mode are able to be output is described above. The sensing signals output from the unit pixels UP1 and UP2 make it possible to perform the averaging operation. Accordingly, the frame rate of the image sensor 100 according to an embodiment may be improved in the high dynamic range (HDR) mode.

Figure 12:
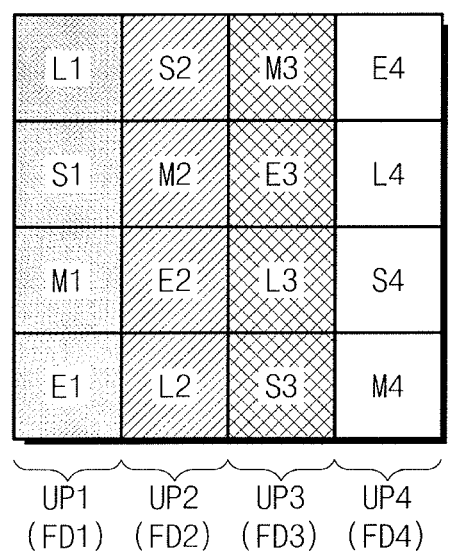
FIG. 12 illustrates a diagram of a unit color pixel in FIG. 1 according to another embodiment.

FIG. 12 is a diagram illustrating another example of the unit color pixel UCP illustrated in FIG. 1. Referring to FIG. 12, the unit color pixel UCP may include four unit pixels UP1, UP2, UP3, and UP4 each including four sub-pixels. That is, the unit color pixel UCP may be implemented with 4×4 pixels constituting four unit pixels each having a 1×4 pixel size.

In this embodiment, one unit color pixel UCP includes four unit pixels UP1, UP2, UP3, and UP4. Each of the unit pixels UP1, UP2, UP3, and UP4 includes four sub-pixels. The unit pixel UP1 may include sub-pixels L1, M1, E1, and S1 and one charge detection node FD1. The sub-pixels L1, M1, E1, and S1 having different effective integration times EIT correspond to photoelectric conversion elements PD1, PD2, PD3, and PD4. The unit pixel UP2 may include sub-pixels L2, M2, E2, and S2 and one charge detection node FD2. The unit pixels UP3 and UP4 have the same structures as the unit pixels UP1 and UP2 except for different sub-pixel arrangements.

The unit color pixel UCP that performs the HDR mode sensing operation according to embodiments with regard to one color includes four unit pixels UP, in each of which a charge detection node is shared. Each of the unit pixels UP may include four sub-pixels. Accordingly, the unit color pixel UCP may have a pixel structure of a 4×4 pixel size, in which four unit pixels each having a 1×4 pixel size are arranged. In this structure, unit pixels according to embodiments may output signals of four sub-pixels having the same effective integration time EIT in the HDR mode sensing operation. Because the averaging operation is able to be performed on the output sensing signals, high-speed binning and analog-to-digital conversion are possible.

Figure 13:
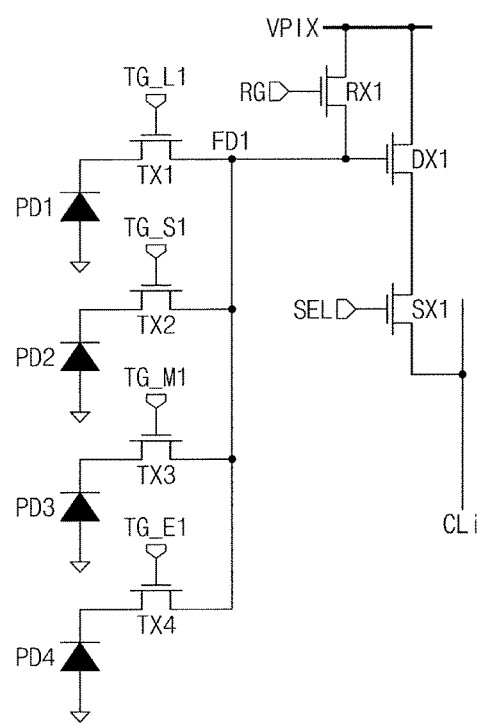
FIG. 13 illustrates a circuit diagram of a structure of a unit pixel in FIG. 12.

FIG. 13 is a circuit diagram illustrating a structure of a unit pixel illustrated in FIG. 12. Referring to FIG. 13, the unit pixel UP1 of a 1×4 pixel size may include a plurality of photoelectric conversion elements PD1, PD2, PD3, and PD4, a plurality of transmission transistors TX1, TX2, TX3, and TX4, the reset transistor RX1, the selection transistor SX1, and the drive transistor DX1. The plurality of photoelectric conversion elements PD1, PD2, PD3, and PD4, the plurality of transmission transistors TX1, TX2, TX3, and TX4, the reset transistor RX1, the selection transistor SX1, and the drive transistor DX1 are substantially the same as those of FIG. 3A. With regard to functions thereof, thus, additional description will be omitted to avoid redundancy.

The HDR mode sensing operation corresponding to four effective integration times EIT may be performed on the four unit pixels UP1 each having the 1×4 pixel size. That is, with regard to the unit pixel UP1 of the 1×4 pixel size, the HDR mode sensing operation is possible in four illumination ranges by using the transmission signals TG_L1, TG_S1, TG_M1, and TG_E1.

According to the description given with reference to FIGS. 12 and 13, the unit color pixel UCP of the 4×4 pixel size includes unit pixels UP of the 1×4 pixel size capable of outputting sensing signals independently of each other. Accordingly, sensing signals corresponding to the same illumination may be generated from the unit pixels UP of the unit color pixel UCP, and the averaging operation may be performed on the generated sensing signals. This means that a frame rate is improved in the HDR mode sensing operation by adopting an image sensor according to embodiments.

FIG. 14 is a diagram illustrating another example of the unit color pixel UCP illustrated in FIG. 1. Referring to FIG. 14, the unit color pixel UCP may include four unit pixels UP1, UP2, UP3, UP4, and UP5 each including five sub-pixels. That is, the unit color pixel UCP may be implemented with 5×5 pixels constituting four unit pixels each having a 1×5 pixel size.

In this embodiment, one unit color pixel UCP includes five unit pixels UP1, UP2, UP3, UP4, and UP5. Each of the unit pixels UP1, UP2, UP3, UP4, and UP5 includes five sub-pixels. The unit pixel UP1 may include sub-pixels L1, M1, E1, S1, and A1 and one charge detection node FD1. The sub-pixels L1, M1, E1, S1, and A1 having different effective integration times EIT correspond to photoelectric conversion elements PD1, PD2, PD3, PD4, and PD5. The unit pixel UP2 may include sub-pixels L2, M2, E2, S2, and A2 and one charge detection node FD2. The unit pixels UP3, UP4, and UP5 including charge detection nodes FD3, FD4, and FD5 have the same structures as the unit pixels UP1 and UP2 except for different sub-pixel arrangements.

The unit color pixel UCP that performs the HDR mode sensing on one color includes five unit pixels UP, in each of which a charge detection node is shared. Each of the unit pixels UP may include five sub-pixels. Accordingly, the unit color pixel UCP may have a pixel structure of a 5×5 pixel size, in which five unit pixels each having a 1×5 pixel size are arranged. In this structure, unit pixels may output signals of five sub-pixels having the same effective integration time EIT in the HDR mode sensing operation. Because the averaging operation is able to be performed on the output sensing signals, high-speed binning and analog-to-digital conversion are possible.

Figure 15:
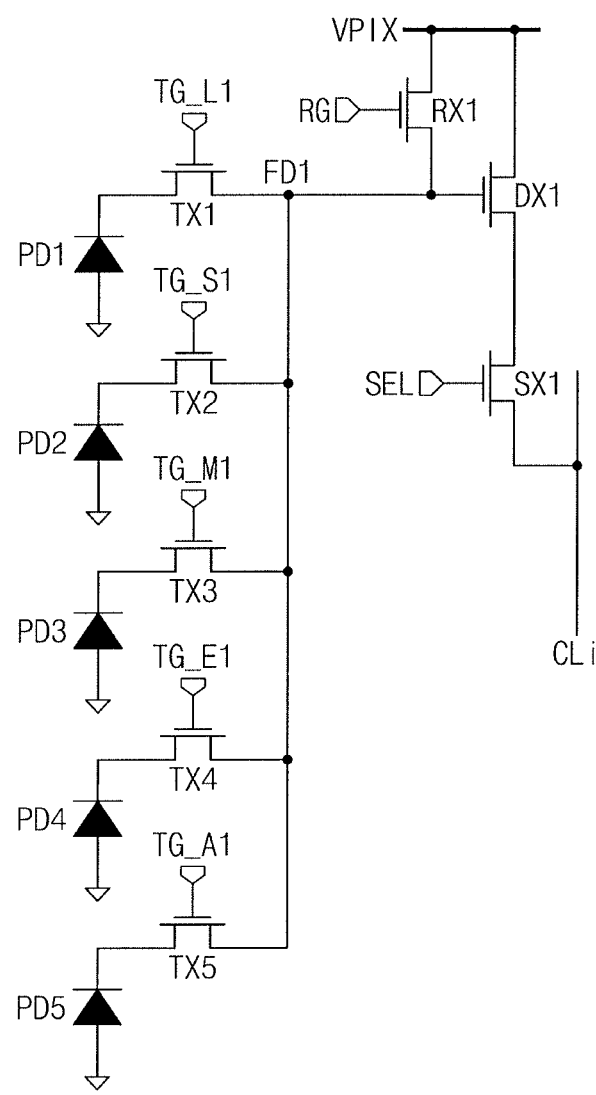
FIG. 15 illustrates a circuit diagram of a structure of a unit pixel in FIG. 14.

FIG. 15 is a circuit diagram illustrating a structure of a unit pixel of FIG. 14. Referring to FIG. 15, the unit pixel UP1 of a 1×5 pixel size may include a plurality of photoelectric conversion elements PD1, PD2, PD3, PD4, and PD5, a plurality of transmission transistors TX1, TX2, TX3, TX4, and TX5, the reset transistor RX1, the selection transistor SX1, and the drive transistor DX1. The plurality of photoelectric conversion elements PD1, PD2, PD3, PD4, and PD5, the plurality of transmission transistors TX1, TX2, TX3, TX4, and TX5, the reset transistor RX1, the selection transistor SX1, and the drive transistor DX1 are substantially the same as those of FIG. 3A. With regard to functions thereof, thus, additional description will be omitted to avoid redundancy.

The HDR mode sensing operation corresponding to five effective integration times EIT may be performed on the five unit pixels UP each having the 1×5 pixel size. That is, with regard to the unit pixel UP1 of the 1×5 pixel size, the HDR mode sensing operation is possible in five illumination ranges by using the transmission signals TG__L1, TG_S1, TG__M1, TG_E1, and TG_A1.

According to the description given with reference to FIGS. 14 and 15, the unit color pixel UCP of the 5×5 pixel size includes unit pixels UP of the 1×5 pixel size capable of outputting sensing signals independently of each other. Accordingly, sensing signals corresponding to the same illumination may be generated from the unit pixels UP of the unit color pixel UCP, and the averaging operation may be performed on the generated sensing signals. This means that a frame rate is improved in the HDR mode sensing operation by adopting an image sensor according to embodiments.

Unit color pixels having 2×2, 3×3, 4×4, and 5×5 pixel sizes are described above to provide the advantages according to embodiments. If necessary, the unit color pixel UCP may be implemented to have a pixel size, in which the number of rows and the number of columns are different, such as 2×3 or 4×3, or the unit color pixel UCP may be implemented to have a pixel size larger than the 5×5 pixel size.

By way of summation and review, when a certain color is saturated due to a narrow dynamic range, the image sensor fails to properly express an original color of the image. Therefore, attempts have been made to implement a high dynamic range (HDR) pixel, e.g., implement a high dynamic range while adjusting a light integration time at the image sensor and to increase a capacity of a floating diffusion (FD) region.

However, the above techniques that are applied to the image sensor require the relatively large area or cause a decrease in a frame rate of the image sensor. Accordingly, there is required a technology for providing a high frame rate while implementing the high dynamic range (HDR).

In contrast, embodiments provide an image sensor capable of performing a sensing operation under various illumination conditions without decreasing a frame rate. That is, an image sensor according to an embodiment may provide a high dynamic range (HDR) image capable of minimizing a decrease in a frame rate or a decrease in a resolution.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An image sensor for sensing an image signal of a plurality of illumination ranges, the image sensor comprising:
a first unit pixel including a first sub-pixel and a second sub-pixel;
a second unit pixel including a third sub-pixel and a fourth sub-pixel;
a timing controller configured:
to apply a first effective integration time to the first sub-pixel and the fourth sub-pixel, such that a first sensing signal and a fourth sensing signal are generated from the first sub-pixel and the fourth sub-pixel, respectively, and to apply a second effective integration time shorter than the first effective integration time to the second sub-pixel and the third sub-pixel, such that a second sensing signal and a third sensing signal are generated from the second sub-pixel and the third sub-pixel, respectively; and an analog-to-digital converter configured to:
perform an averaging operation on the first sensing signal and the fourth sensing signal, and
perform an averaging operation on the second sensing signal and the third sensing signal,
wherein the first sub-pixel and the second sub-pixel share a first charge detection node, and
wherein the third sub-pixel and the fourth sub-pixel share a second charge detection node.

2. The image sensor of claim 1, wherein:
the first unit pixel further includes:
first and second photoelectric conversion elements corresponding to the first and second sub-pixels, respectively, and
the first charge detection node to accumulate charges transmitted from one of the first and second photoelectric conversion elements, and
the second unit pixel further includes:
third and fourth photoelectric conversion elements corresponding to the third and fourth sub-pixels, respectively, and
the second charge detection node to accumulate charges transmitted from one of the third and fourth photoelectric conversion elements.

3. The image sensor of claim 2, wherein:
the first and fourth photoelectric conversion elements integrate photoelectrons during the first effective integration time, and
the second and third photoelectric conversion elements integrate photoelectrons during the second effective integration time.

4. The image sensor of claim 3, wherein:
the first sensing signal and the fourth sensing signal are generated from the first charge detection node, and
the second sensing signal and the third sensing signal are generated from the second charge detection node.

5. The image sensor of claim 4, wherein:
the first sensing signal and the fourth sensing signal are simultaneously generated, and
the second sensing signal and the third sensing signal are simultaneously generated.

6. The image sensor of claim 1, wherein the first unit pixel and the second unit pixel are included in a unit color pixel for sensing a same color.

7. The image sensor of claim 6, wherein:
the first unit pixel further includes a fifth sub-pixel and the second unit pixel further includes a sixth sub-pixel,
the unit color pixel further includes seventh to ninth sub-pixels, and
a third effective integration time shorter than the second effective integration time is applied to the fifth sub-pixel, the sixth sub-pixel, and the seventh sub-pixel so as to generate a fifth sensing signal, a sixth sensing signal, and a seventh sensing signal.

8. The image sensor of claim 7, wherein the fifth sensing signal, the sixth sensing signal, and the seventh sensing signal are simultaneously generated.

9. The image sensor of claim 8, wherein the fifth sensing signal, the sixth sensing signal, and the seventh sensing signal are averaged by the analog-to-digital converter in an analog manner.

10. A driving method of an image sensor including first to fourth sub-pixels constituting a unit color pixel, the method comprising:
sampling a first sensing signal and a second sensing signal from the first sub-pixel and the second sub-pixel, respectively, by applying a first effective integration time to the first sub-pixel and the second sub-pixel;
sampling a third sensing signal and a fourth sensing signal from the third sub-pixel and the fourth sub-pixel, respectively, by applying a second effective integration time shorter than the first effective integration time to the third sub-pixel and the fourth sub-pixel;
performing an averaging operation on the first sensing signal and the second sensing signal; and
performing the averaging operation on the third sensing signal and the fourth sensing signal,
wherein the first sub-pixel and the fourth sub-pixel share a first charge detection node, and
wherein the second sub-pixel and the third sub-pixel share a second charge detection node.

11. The method of claim 10, wherein:
in the sampling of the first sensing signal and the second sensing signal, the first sensing signal and the second sensing signal are simultaneously sampled, and
in the sampling of the third sensing signal and the fourth sensing signal, the third sensing signal and the fourth sensing signal are simultaneously sampled.

12. The method of claim 10, wherein:
the unit color pixel further includes a fifth sub-pixel sharing the first charge detection node, a sixth sub-pixel sharing the second charge detection node, and seventh to ninth sub-pixels sharing a third charge detection node, and
the method further comprises sampling sensing signals from the fifth sub-pixel, the sixth sub-pixel, and the seventh sub-pixel, respectively, by applying a third effective integration time shorter than the second effective integration time to the fifth sub-pixel, the sixth sub-pixel, and the seventh sub-pixel.

13. The method of claim 12, wherein:
in sampling the first sensing signal and the second sensing signal, a fifth sensing signal is sampled from the eighth sub-pixel, and
in sampling the third sensing signal and the fourth sensing signal, a sixth sensing signal is sampled from the ninth sub-pixel.

14. The method of claim 10, further comprising generating a high dynamic range image by using a result of the averaging operation.

15. An image sensor for sensing an image signal of a plurality of illumination ranges, the image sensor comprising:
a first unit pixel including a first sub-pixel, a second sub-pixel, and a third sub-pixel sharing a first charge detection node;
a second unit pixel including a fourth sub-pixel, a fifth sub-pixel, and a sixth sub-pixel sharing a second charge detection node; and
a third unit pixel including a seventh sub-pixel, an eighth sub-pixel, and a ninth sub-pixel sharing a third charge detection node,
wherein the first unit pixel, the second unit pixel, and the third unit pixel output sensing signals individually by using the first charge detection node, the second charge detection node, and the third charge detection node, and wherein the first to third unit pixels constitute a unit color pixel corresponding to a single color for the purpose of sensing the image signal in the plurality of illumination ranges.

16. The image sensor of claim 15, wherein:

the first unit pixel further includes first to third photoelectric conversion elements respectively corresponding to the first to third sub-pixels, the first unit pixel to accumulate charges transmitted from one of the first to third photoelectric conversion elements at the first charge detection node, the second unit pixel further includes fourth to sixth photoelectric conversion elements respectively corresponding to the fourth to sixth sub-pixels, the second unit pixel to accumulate charges transmitted from one of the fourth to sixth photoelectric conversion elements at the second charge detection node, and the third unit pixel further includes seventh to ninth photoelectric conversion elements respectively corresponding to the seventh to ninth sub-pixels, the third unit pixel to accumulate charges transmitted from one of the seventh to ninth photoelectric conversion elements at the second charge detection node.

17. The image sensor of claim 16, further comprising a timing controller configured to control the first to third unit pixels, such that first sensing signals are respectively output from the first sub-pixel, the fourth sub-pixel, and the seventh sub-pixel with a first effective integration time applied to the first sub-pixel, the fourth sub-pixel, and the seventh sub-pixel, such that second sensing signals are respectively output from the second sub-pixel, the fifth sub-pixel, and the eighth sub-pixel with a second effective integration time shorter than the first effective integration time applied to the second sub-pixel, the fifth sub-pixel, and the eighth sub-pixel, and such that third sensing signals are respectively output from the third sub-pixel, the sixth sub-pixel, and the ninth sub-pixel with a third effective integration time shorter than the second effective integration time applied to the third sub-pixel, the sixth sub-pixel, and the ninth sub-pixel.

18. The image sensor of claim 17, further comprising a binning circuit configured to perform an averaging operation on the first sensing signals, on the second sensing signals, and on the third sensing signals, respectively.

19. The image sensor of claim 17, wherein the timing controller is to control the first to third unit pixels such that the first sensing signals are simultaneously output, such that the second sensing signals are simultaneously output, and such that the third sensing signals are simultaneously output.

* * * * *